(12) United States Patent
Wei et al.

(10) Patent No.: US 7,220,489 B1
(45) Date of Patent: May 22, 2007

(54) LAYERED STRUCTURES FOR OPTICAL REFLECTORS

(75) Inventors: Chang Wei, Niskayama, NY (US); Barry Lee-Mean Yang, Dublin, OH (US); Yiqun Pan, Brookfield, WI (US)

(73) Assignee: Lockheed Martin Corporation, Bethesda, MD (US)

( * ) Notice: Subject to any disclaimer, the term of this patent is extended or adjusted under 35 U.S.C. 154(b) by 218 days.

(21) Appl. No.: 10/826,645

(22) Filed: Apr. 16, 2004

(51) Int. Cl.
*B32B 13/04* (2006.01)
*G02B 7/192* (2006.01)

(52) U.S. Cl. ............... 428/446; 428/698; 359/848; 359/868

(58) Field of Classification Search ........... 428/446, 428/698; 359/848, 868
See application file for complete search history.

(56) References Cited

U.S. PATENT DOCUMENTS

| | | | |
|---|---|---|---|
| 4,666,760 A | 5/1987 | Hasuda et al. | |
| 5,425,983 A * | 6/1995 | Propst et al. | 428/216 |
| 5,541,010 A | 7/1996 | Tanzilli et al. | |
| 6,290,180 B1 | 9/2001 | Browall et al. | |
| 6,362,091 B1 * | 3/2002 | Andideh et al. | 438/624 |
| 6,461,899 B1 * | 10/2002 | Kitakado et al. | 438/149 |
| 6,587,263 B1 * | 7/2003 | Iacovangelo et al. | 359/359 |
| 2003/0155632 A1* | 8/2003 | Goldstein | 257/639 |

* cited by examiner

*Primary Examiner*—John J. Zimmerman
*Assistant Examiner*—G. Blackwell
(74) *Attorney, Agent, or Firm*—McDermott Will & Emery LLP

(57) ABSTRACT

Device of layered structures for optical reflectors and method for making the device. A device for providing environmental stability and mechanical integrity in space includes a substrate and a first silicon oxynitride layer on the substrate. The first silicon oxynitride layer has a tensile stress. Additionally, the device includes a second silicon oxynitride layer on the first silicon oxynitride layer. The second silicon oxynitride layer has a compressive stress.

19 Claims, 8 Drawing Sheets

LAYERED STRUCTURES FOR OPTICAL REFLECTORS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to thermal insulation technology. More particularly, the invention provides a layered structure to an optical reflector. Merely by way of example, the invention has been applied to a satellite system, but it would be recognized that the invention has a much broader range of applicability.

A satellite uses thermal insulation to control the internal temperature of the satellite. The internal temperature should be maintained so that various instruments in the satellite can function properly. The satellite instruments usually include sensitive electronic systems susceptible to malfunctions caused by thermal variations. Hence the high-quality thermal insulation is important for proper functioning of the satellite.

One type of thermal insulation used by satellite includes an optical solar reflector. The optical solar reflector protects an exterior surface of the satellite. To control the internal temperature of the satellite, the optical solar reflector suppresses the absorption of heat from the solar radiation and facilitate the radiation of heat from the satellite. For example, the optical solar reflector reflects solar energy incident on the satellite and emits heat energy produced by the satellite. Consequently, the optical solar reflector should usually have a low ratio of absorption coefficient to emissivity.

Also, the optical solar reflector should have high environmental stability and mechanical integrity. The environmental stability can ensure longitivity of the optical solar reflector. The optical solar reflector needs to function properly for the lifetime of the satellite; otherwise, the satellite instruments may malfunction prematurely. Similarly, the mechanical integrity can ensure sufficient coverage of the solar optical reflector on the satellite. For example, the optical solar reflector should have sufficient mechanical integrity to cover both curved surfaces and flat surfaces of the satellite; otherwise, the exposed curved surfaces may cause the malfunction of the satellite.

The conventional optical solar reflector usually cannot meet both criteria of high environmental stability and mechanical integrity. For example, an optical solar reflector may be a flexible optical solar reflector that includes a polymer-based heat radiation layer. But the flexible optical solar reflector usually suffers from deterioration of the polymer layer under the radiation of solar energy. Hence the optical reflector does not have sufficient environmental stability. As another example, an optical reflector may be a rigid optical solar reflector which includes a glass-based heat radiation layer. The rigid optical solar reflector is usually flat; therefore it can be used only at limited locations on the satellite. Further, the rigid solar reflector is usually difficult to handle during manufacturing and assembling. Hence the rigid optical solar reflector lacks desirable mechanical integrity.

It is desirable to improve an optical solar reflector.

BRIEF SUMMARY OF THE INVENTION

The present invention relates generally to thermal insulation technology. More particularly, the invention provides a layered structure to an optical reflector. Merely by way of example, the invention has been applied to a satellite system, but it would be recognized that the invention has a much broader range of applicability.

According to the present invention, a number of embodiments of the layered structures for optical reflectors are provided. Merely by way of an example, a device for providing environmental stability and mechanical integrity in space includes a substrate and a first silicon oxynitride layer on the substrate. The first silicon oxynitride layer has a tensile stress. Additionally, the device includes a second silicon oxynitride layer on the first silicon oxynitride layer. The second silicon oxynitride layer has a compressive stress.

According to another embodiment of the present invention, a device for providing environmental stability and mechanical integrity in space includes a substrate and a first coating layer on the substrate. The first coating layer has a tensile stress. Additionally, the device includes a second coating layer on the first coating layer. The second coating layer has a compressive stress. The first coating layer is free from delamination and cracking and the second coating layer is free from delamination and cracking after at least 60 hours under a first UV radiation in a first vacuum condition. The first UV radiation has a first UV intensity equal to a second UV intensity of a second UV radiation received by a spacecraft in space. The first vacuum condition has a first vacuum pressure ranging from $1 \times 10^{-1}$ torr to $1 \times 10^{-3}$ torr.

According to yet another embodiment of the present invention, a device having environmental stability and mechanical stability in space includes a substrate and a first coating layer on the substrate. The first coating layer has a tensile stress. Additionally, the device includes a second coating layer on the first coating layer. The second coating layer has a compressive stress. The first coating layer is free from delamination and cracking and the second coating layer is free from delamination and cracking after at least 3000 hours under a first UV radiation and a first electron and proton bombardment in a first vacuum condition. The first electron and proton bombardment has a first electron and proton intensity equal to a second electron and proton intensity of a second electron and proton bombardment received by a spacecraft in space. The first UV radiation has a second UV intensity of a second UV radiation received by the spacecraft in space. The second vacuum condition has a second vacuum pressure ranging from $1 \times 10^{-12}$ torr to $1 \times 10^{-7}$ torr.

According to yet another embodiment of the present invention, a device for providing environmental stability and mechanical integrity in space includes a substrate and a silicon oxynitride coating layer on the substrate. The silicon oxynitride layer has a changing stress, the changing stress being compressive on a top surface of the silicon oxynitride coating layer and tensile on a bottom surface of the silicon oxynitride coating layer.

According to yet another embodiment of the present invention, the method for making a protection device includes depositing a first silicon oxynitride layer on a substrate using a first plasma enhanced chemical vapor deposition process, and depositing a second silicon oxynitride layer on the first silicon oxynitride layer with a second plasma enhanced chemical vapor deposition process. The first plasma enhanced chemical vapor deposition process has a first power and a first pressure, and the second plasma enhanced chemical vapor deposition process has a second power and a second pressure. The second power is higher than the first power, and the second pressure is higher than the first pressure.

According to yet another embodiment of the present invention, an optical solar reflector for providing environmental stability and mechanical integrity in space includes a substrate, a reflection layer, and a first silicon oxynitride layer on the reflection layer. The first silicon oxynitride layer has a tensile stress. Additionally, the reflector includes a second silicon oxynitride layer on the first silicon oxynitride layer. The second silicon oxynitride layer has a compressive stress.

Many benefits may be achieved by way of the present invention over conventional techniques. For example, certain embodiments of the present invention can improve environmental stability while maintaining mechanical integrity. Additionally, some embodiments of the present invention can enhance optical performance of an optical solar reflector, allow application of an optical reflector on large areas of exterior surface of a satellite, and provide flexible handling capability.

Depending upon the embodiment under consideration, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates generally to thermal insulation technology. More particularly, the invention provides a layered structure to an optical reflector. Merely by way of example, the invention has been applied to a satellite system, but it would be recognized that the invention has a much broader range of applicability.

The conventional solar optical reflector has disadvantages. For example, an optical solar reflector includes a silver-coated glass sheet and is manually glued down to an exterior surface of a satellite. The exterior surface of the satellite is usually made of aluminum alloys or carbon composites. Such optical solar reflector and its assembly may incur high material cost, cover only limited areas of the exterior surface, have an undesired weight and suffer from a high breakage rate due to intensive manual handling.

To overcome these disadvantages, a plasma-enhanced chemical vapor deposition (PECVD) process has been developed. The PECVD process deposits a reflector coating such as $SiO_xN_y$ on a reflector substrate. The low-stress PECVD coating exhibits high mechanical integrity, but often has low environmental stability. Certain embodiments of the present invention enhances environmental stability while maintaining mechanical integrity of the optical solar reflector.

Figure 1:
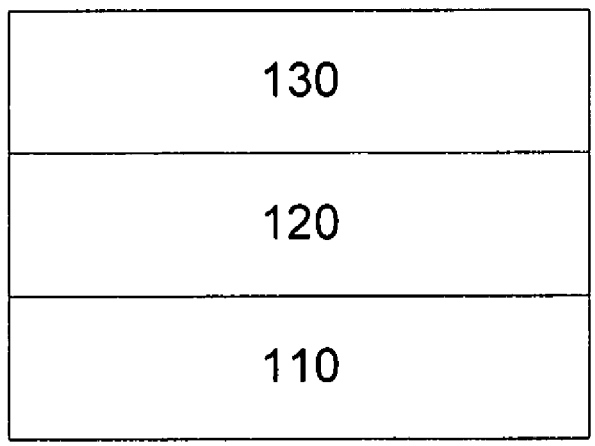
FIG. 1 is a simplified apparatus according to an embodiment of the present invention.

FIG. 1 is a simplified apparatus according to an embodiment of the present invention. This diagram is merely an example, which should not unduly limit the scope of the claims. One of ordinary skill in the art would recognize many variations, alternatives, and modifications. The apparatus 100 includes a substrate 110, a first $SiO_xN_y$ layer 120, and a second $SiO_xN_y$ layer 130. Although the above has been shown using a selected group of layers, there can be many alternatives, modifications, and variations. For example, some of the layers may be expanded and/or combined. The first $SiO_xN_y$ layer 120 and the second $SiO_xN_y$ layer 130 can be combined, and the combined layer has a gradual change in characteristics from those of the first layer 120 to those of the second layer 130. Other layers may be inserted to those noted above. A reflection layer, such as a silver layer, can be inserted between the substrate 110 and the first $SiO_xN_y$ layer 120. An additional layer may be deposited onto the second $SiO_xN_y$ layer 130. Depending upon the embodiment, the sequence of layers may be interchanged with others replaced. Further detail of these layers are found throughout the present specification and more particularly below.

The substrate 110 serves as an interface between the solar optical reflector and a satellite. The substrate can be made of various types of materials. These materials include polymer, ceramic, carbon composite, Kapton, black Kapton, aluminum, aluminum alloy, silver, gold, platinum, titanium, any combination thereof, or other suitable material.

The first $SiO_xN_y$ layer 120 is a tensile-stress layer on the substrate 110. The first $SiO_xN_y$ layer 120 is deposited by a PECVD process. The PECVD process usually uses a low pressure and a low power. The x value usually ranges from 0 to 2. The y value usually ranges from 0 to 4/3. The thickness of the first $SiO_xN_y$ layer 120 ranges, for example, from 5 μm to 35 μm. For instance, the first $SiO_xN_y$ layer 120 has a thickness approximately equal to 20 micron. The tensile stress of the first $SiO_xN_y$ layer 120 is usually low and may range from 0.01 MPa to 1 MPa. For example, the tensile stress equals approximately 0.5 MPa.

The second $SiO_xN_y$ layer 130 is a compressive-stress layer on the first $SiO_xN_y$ layer 120. The second $SiO_xN_y$ layer 130 is deposited by a PECVD process. The PECVD process usually uses a high pressure and a high power. The x value usually ranges from 0 to 2. The y value usually ranges from 0 to 4/3. The thickness of the second $SiO_xN_y$ layer 130 ranges, for example, from 0.5 μm to 5 μm. For instance, the second $SiO_xN_y$ layer 130 has a thickness approximately equal to 2.5 micron. The compressive stress of the second $SiO_xN_y$ layer 130 may range from 1 MPa to 100 MPa. For example, the compressive stress equals approximately 20 MPa.

The combination of the first silicon oxynitride layer 120 and the second silicon oxynitride layer 130 provides both high environmental stability and high mechanical integrity. For example, the low-stress first layer 120 provides high mechanical and structural integrity. The second layer 130 provides high environmental stability including resistance to ultraviolet radiation. The combination of the first and second layers has demonstrated excellent environmental stability under space conditions and mechanical integrity for handling and assembling of the optical solar reflector.

Figure 2:
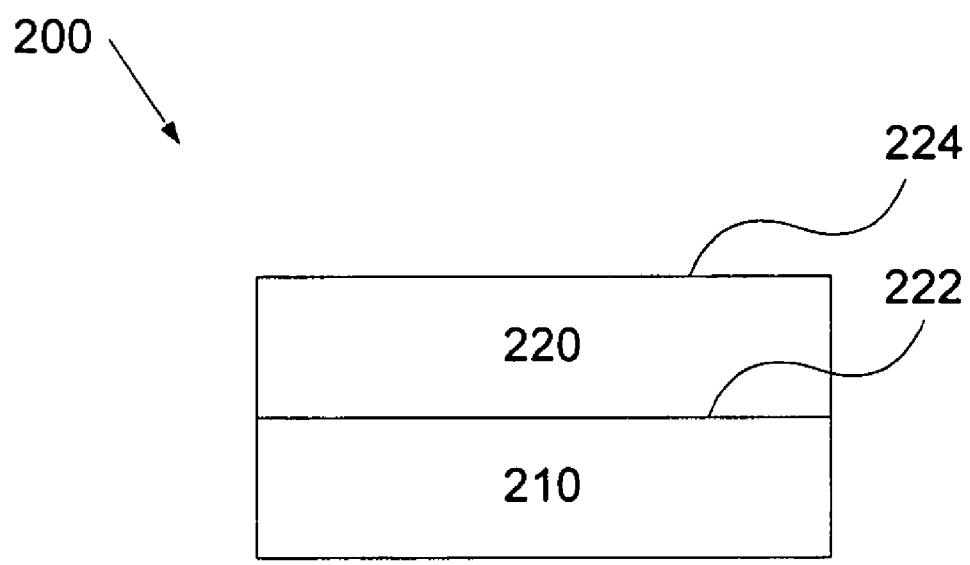
FIG. 2 is a simplified apparatus for solar optical reflection according to another embodiment of the present invention.

As discussed above and further emphasized here, various modifications can be made to the structure as shown in FIG. 1. FIG. 2 is a simplified apparatus for solar optical reflection according to another embodiment of the present invention. This diagram is merely an example, which should not unduly limit the scope of the claims. One of ordinary skill in the art would recognize many variations, alternatives, and modifications. The apparatus 200 includes a substrate 210 and a $SiO_xN_y$ layer 220. The $SiO_xN_y$ layer 220 is deposited on the substrate 210. The $SiO_xN_y$ layer has a varying stress that changes from a tensile stress at a bottom surface 222 to a compressive stress at a top surface 224. Additional layers may be inserted between the substrate 210 and the $SiO_xN_y$ layer 220 or deposited onto the $SiO_xN_y$ layer 220.

Figure 3:
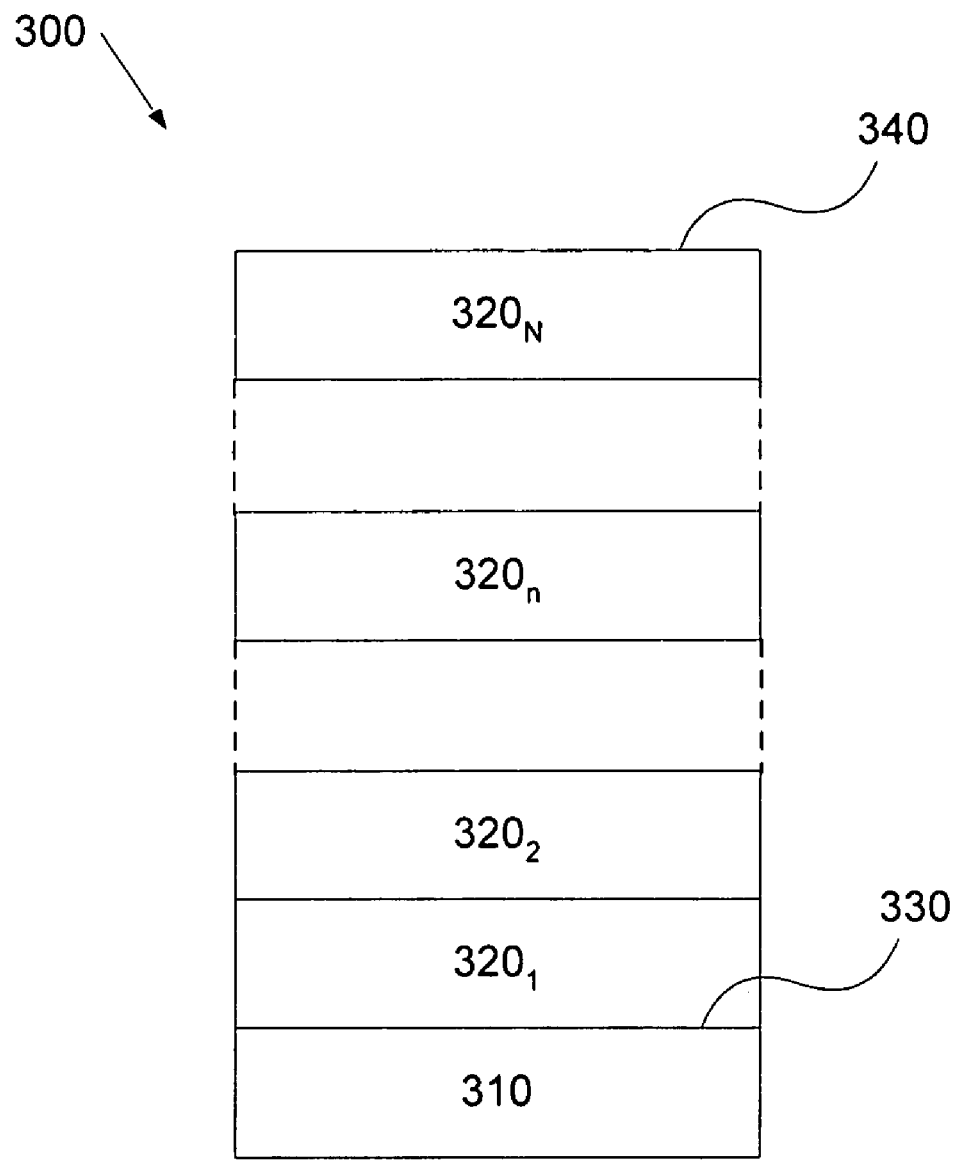
FIG. 3 is a simplified apparatus according to yet another embodiment of the present invention.

FIG. 3 is a simplified apparatus according to yet another embodiment of the present invention. This diagram is merely an example, which should not unduly limit the scope of the claims. One of ordinary skill in the art would recognize many variations, alternatives, and modifications. The apparatus 300 includes a substrate 310 and a group of $SiO_xN_y$ layers including $SiO_xN_y$ layers $320_1$, $320_2$, . . . , $320_n$, . . . , and $320_N$. N is a positive integer. The $SiO_xN_y$ layers $320_1$, $320_2$, . . . , $320_n$, . . . , and $320_N$ each have a substantially constant stress, but their stresses vary from one layer to another. The stresses of the $SiO_xN_y$ layers $320_1$, $320_2$, . . . , $320_n$, . . . , and $320_N$ change from a tensile stress at a bottom surface 330 to a compressive stress at a top surface 340. Additional layers may be inserted between the substrate 310 and the $SiO_xN_y$ layer $320_1$, between any of the $SiO_xN_y$ layers $320_1$, $320_2$, . . . , $320_n$, . . . , and $320_N$, or deposited on the top surface 340.

Figure 4:
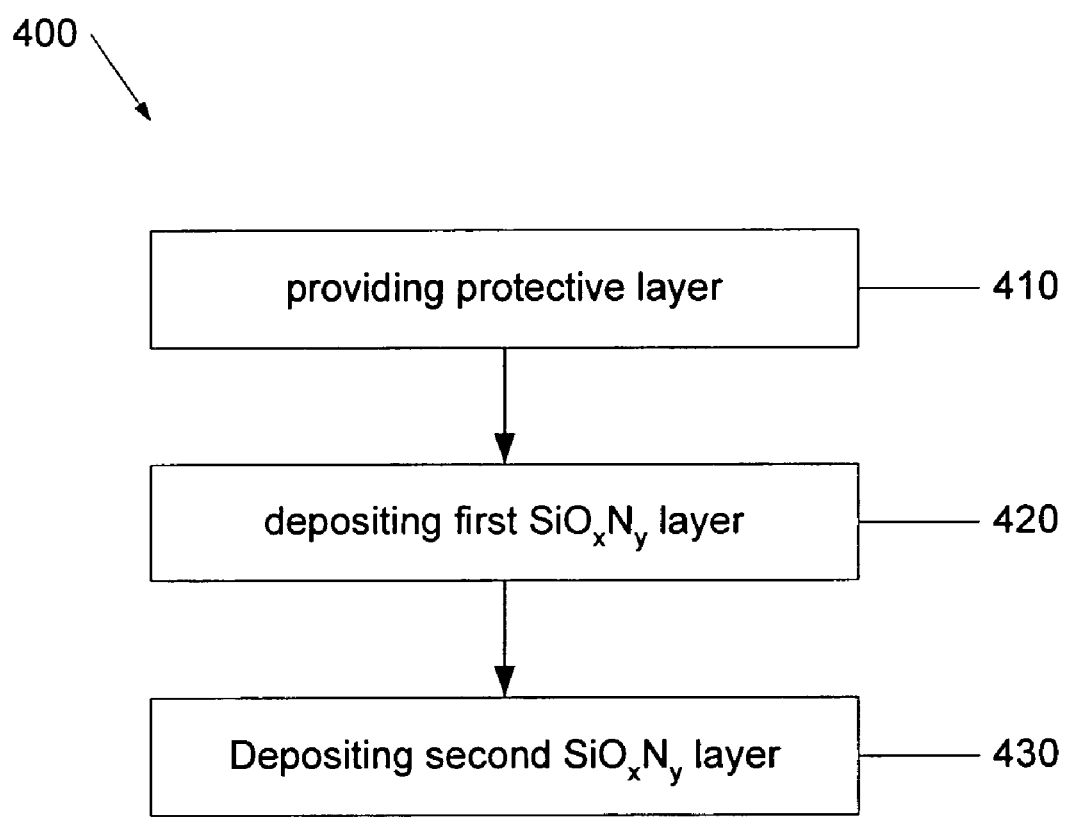
FIG. 4 is a simplified method according to an embodiment of the present invention.

FIG. 4 is a simplified method according to an embodiment of the present invention. This diagram is merely an example, which should not unduly limit the scope of the claims. One of ordinary skill in the art would recognize many variations, alternatives, and modifications. The method 400 includes a process 410 for providing a substrate, a process 420 for depositing a first $SiO_xN_y$ layer, and a process 430 for depositing a second $SiO_xN_y$ layer. Although the above has been shown using a selected sequence of processes, there can be many alternatives, modifications, and variations. For example, some of the processes may be expanded and/or combined. The process 420 and the process 430 can be combined to make a $SiO_xN_y$ layer with a gradual change in characteristics from those of the first $SiO_xN_y$ layer to those of the second $SiO_xN_y$ layer. Other processes may be inserted to those noted above. A process may be inserted between the process 410 and the process 420 to deposit a reflection layer, such as a silver layer, between the substrate and the first $SiO_xN_y$ layer. An additional process may be inserted between the process 420 and the process 430 to deposit an additional layer, such as a $SiO_xN_y$ layer, between the first $SiO_xN_y$ layer and the second $SiO_xN_y$ layer. Yet an additional process may be added after the process 430 layer to deposit an additional layer onto the second $SiO_xN_y$ layer. Yet an additional process may be added after any of processes 410, 420, and 430 in order to clean the respective top surfaces of the substrate, the first $SiO_xN_y$ layer, and the second $SiO_xN_y$ layer. The cleaning process, for example, may use a sputtering process with helium, argon, or both. Depending upon the embodiment, the specific sequence of processes may be interchanged with others replaced. Further detail of these processes are found throughout the present specification and more particularly below.

At the process 410, a substrate is provided. The substrate can be made of various types of materials. These materials include polymer, ceramic, carbon composite, Kapton, black Kapton, aluminum, aluminum alloy, silver, gold, platinum, titanium, any combination thereof, or other suitable material. For example, at the process 410, a 6 inch by 6 inch plain Kapton substrate is provided.

At the process 420, a first $SiO_xN_y$ layer is deposited. The deposition may use various types of fabrication techniques, such as sputtering, chemical vapor deposition ("CVD"), low pressure chemical vapor deposition ("LPCVD"), plasma enhanced chemical vapor deposition ("PECVD"), or other process. For example, the deposition of the first $SiO_xN_y$ layer uses a PECVD process. The PECVD process uses silane, nitrous oxide, ammonia, and argon. The flow rate of silane ranges from 200 sccm to 800 sccm, the flow rate of nitrous oxide ranges from 10 sccm to 50 sccm, the flow rate of ammonia ranges from 10 sccm to 90 sccm, and the flow rate of argon ranges from 200 sccm to 1000 sccm. For example, the flow rates of silane, nitrous oxide, ammonia and argon are 500 sccm, 30 sccm, 50 sccm and 600 sccm respectively. The deposition is usually performed at a temperature ranging from 20° C. to 95° C., with a power ranging from 25 W to 250 W, and under a pressure ranging ranges from 100 mTorr to 2000 mTorr. For example, the deposition of the first $SiO_xN_y$ layer is performed at 55° C. with a power of 150 W and a pressure of 1200 mTorr. The deposition time can vary from 4 hours to 10 hours. For example, the deposition time equals 6.5 hours. The resulting coating thickness varies from 5 microns to 35 microns. For example, the first $SiO_xN_y$ layer is 19.5 microns in thickness.

At the process 430, a second $SiO_xN_y$ layer is deposited on the first second $SiO_xN_y$ layer. The deposition may use various types of fabrication techniques, such as sputtering, chemical vapor deposition ("CVD"), low pressure chemical vapor deposition ("LPCVD"), plasma enhanced chemical vapor deposition ("PECVD"), or other processes. For example, the deposition of the second $SiO_xN_y$ layer uses a PECVD process. The PECVD process uses silane, nitrous oxide, ammonia, and argon. The flow rate of silane ranges from 200 sccm to 600 sccm, the flow rate of nitrous oxide ranges from 10 sccm to 50 sccm, the flow rate of ammonia ranges from 5 sccm to 20 sccm, and the flow rate of argon ranges from 600 sccm to 1600 sccm. For example, the flow rates of silane, nitrous oxide, ammonia and argon are 400 sccm, 30 sccm, 14 sccm and 1180 sccm respectively. The deposition is usually performed at a temperature ranging from 20° C. to 95° C., with a power ranging from 250 W to 500 W, and under a pressure ranging from 1000 mTorr to 2000 mTorr. For example, the deposition of the first $SiO_xN_y$ layer is performed at 55° C. with a power of 325 W and a pressure of 1600 mTorr. Additionally, the deposition time varies from 5 minutes to 3 hours. For example, the deposition time equals 1 hour. The resulting coating thickness can vary from 0.5 micron to 5 microns. For example, the first $SiO_xN_y$ layer is 2.5 microns in thickness.

Experiments have been performed to demonstrate advantages of certain embodiments of the present invention. According to one embodiment of the present invention, a bi-layer structure of $SiO_xN_y$ was deposited onto a 6-inch-by-6-inch plain Kapton substrate using PECVD processes with different conditions. The first $SiO_xN_y$ layer was slightly tensile and was deposited onto the silver coated plain Kapton. The flow rates of silane, nitrous oxide, ammonia and argon were 500 sccm, 30 sccm, 50 sccm and 600 sccm respectively. The deposition was performed at 55° C. with a power of 150 W and a pressure of 1200 mTorr. The deposition time was 6.5 hours. The resulting coating thickness is 19.5 microns. The second $SiO_xN_y$ layer was deposited onto the first $SiO_xN_y$ layer. The flow rates of silane, nitrous oxide, ammonia and argon were 400 sccm, 30 sccm, 14 sccm and 1180 sccm respectively. The deposition was performed at 55° C. with a power of 325 W and a pressure of 1600 mTorr. The deposition time was 1 hour. The resulting coating had a thickness of 2.5 microns and was highly compressive.

Figure 5:
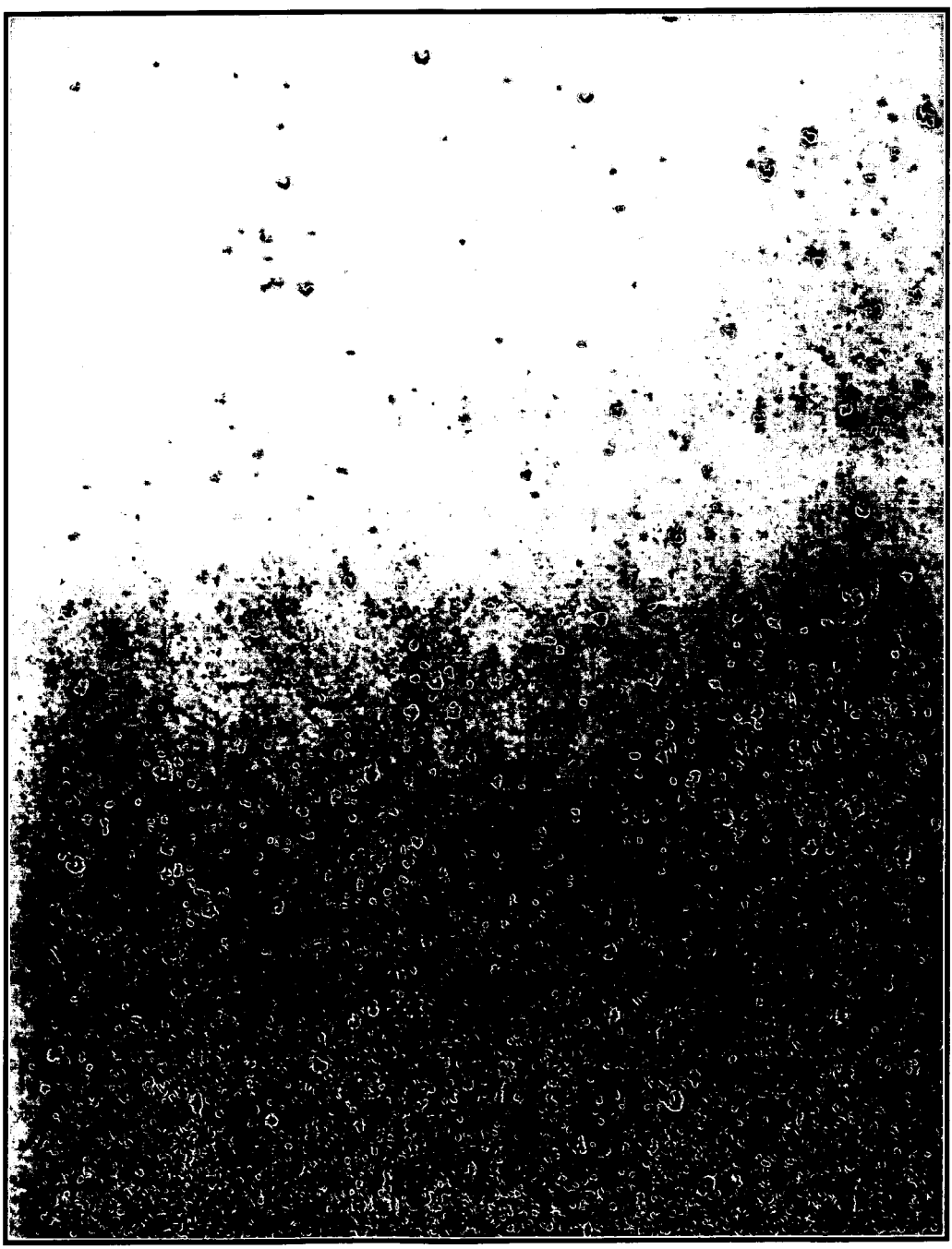
FIG. 5 shows absence of sign of cracking or delamination after over 60 hours of the UV exposure for a bi-layer structure of $SiO_xN_y$.

In one experiment, the above bi-layer structure having the first and second $SiO_xN_y$ layers was then placed into a vacuum chamber with a pressure of about $10^{-6}$ torr. In the vacuum chamber, the bi-layer structure was exposed to the UV radiation whose intensity approximately equals the UV radiation to a satellite in space. FIG. 5 shows that after over 60 hours of the UV exposure, the coating presents no sign of cracking or delamination.

In another experiment, the above bi-layer structure having the first and second $SiO_xN_y$ layers was placed in a standard testing chamber for environmental stability. The chamber was under a vacuum with UV radiation and electron and proton bombardment. The intensity of the UV radiation approximately equals that of the UV radiation to a satellite in space, and the intensity of the electron and proton bombardment approximately equals the intensity of such bombardment to a satellite in space. After 3000 hours, the coating showed no sign of cracking or delamination. Therefore, the above bi-layer structure passed the ground test under simulated space conditions.

Figure 6:
FIG. 6 shows cracking and delamination after 8 hours of UV exposure for a single $SiO_xN_y$ layer.

Other experiments have also been performed to demonstrate disadvantages of a single $SiO_xN_y$ layer. In one experiment, a single $SiO_xN_y$ layer was deposited on a 6-inch-by-6-inch silver-coated Kapton layer. Gases of silane, nitrous oxide, ammonia and argon were used and the respective flow rates were 500 sccm, 30 sccm, 50 sccm and 600 sccm. The deposition was performed at 55° C. with a power of 150 W and a pressure of 1200 mTorr. After 7 hours of deposition, the resulting coating had a thickness of about 19 microns and a slight tensile stress. This single-layer structure was then placed into a vacuum chamber with a pressure of about $10^{-6}$ torr. The structure was exposed to UV radiation whose intensity equals to that of the UV radiation to a satellite in space. FIG. 6 shows that after 8 hours of UV exposure, the coating cracked and eventually delaminated. Hence the single tensile-stress $SiO_xN_y$ layer does not have high environmental stability.

In another experiment, a single $SiO_xN_y$ layer was deposited on a 6-inch-by-6-inch silver-coated Kapton layer by a PECVD process. Gases of silane, nitrous oxide, ammonia and argon were used and their respective flow rates were 400 sccm, 30 sccm, 14 sccm and 1180 sccm. The deposition was performed at 55° C. with a power of 325 W and a pressure of 1600 mTorr. The deposition time was about 7 hours. The resulting $SiO_xN_y$ layer had a highly compressive stress and low mechanical integrity with severe cracks. Hence the single compressive-stress $SiO_xN_y$ layer has low mechanical stability.

From the above experiments, it can be seen that certain embodiments of the present invention can improve environmental stability while maintaining mechanical integrity. These embodiments use a bi-layer structure with different stresses in each layer. Additionally, some embodiments of the present invention can enhance optical performance of an optical solar reflector, allow application of an optical reflector on large areas of exterior surface of a satellite, and provide flexible handling capability. The present invention can be applied to a broad range of applications that require good environmental stability and mechanical integrity.

Figure 7:
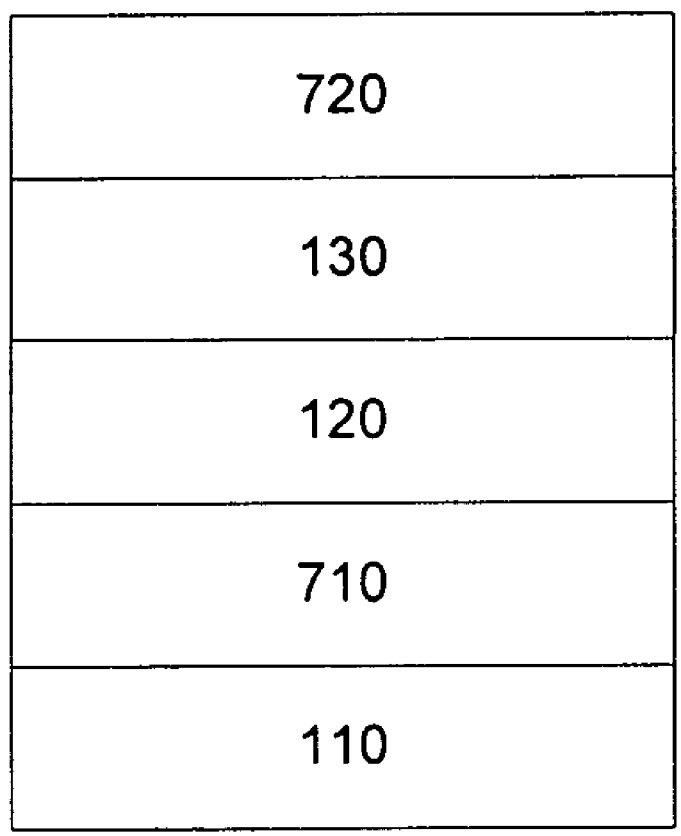
FIG. 7 is a simplified optical solar reflector according to an embodiment of the present invention.

For example, the bi-layer structure of the present invention can be used to make an optical solar reflector. FIG. 7 is a simplified optical solar reflector according to an embodiment of the present invention. This diagram is merely an example, which should not unduly limit the scope of the claims. One of ordinary skill in the art would recognize many variations, alternatives, and modifications. The optical solar reflector 700 includes the substrate 110, a reflection layer 710, the first $SiO_xN_y$ layer 120, the second $SiO_xN_y$ layer 130, and a top layer 720. For example, the reflection layer 710 comprises silver, and the top layer 720 comprises $TiO_2$. Although the above has been shown using a selected group of layers, there can be many alternatives, modifications, and variations. For example, some of the layers may be expanded and/or combined. The first $SiO_xN_y$ layer 120 and the second $SiO_xN_y$ layer 130 can be combined, and the combined layer has a gradual change in characteristics from those of the first layer 120 to those of the second layer 130.

Figure 8:
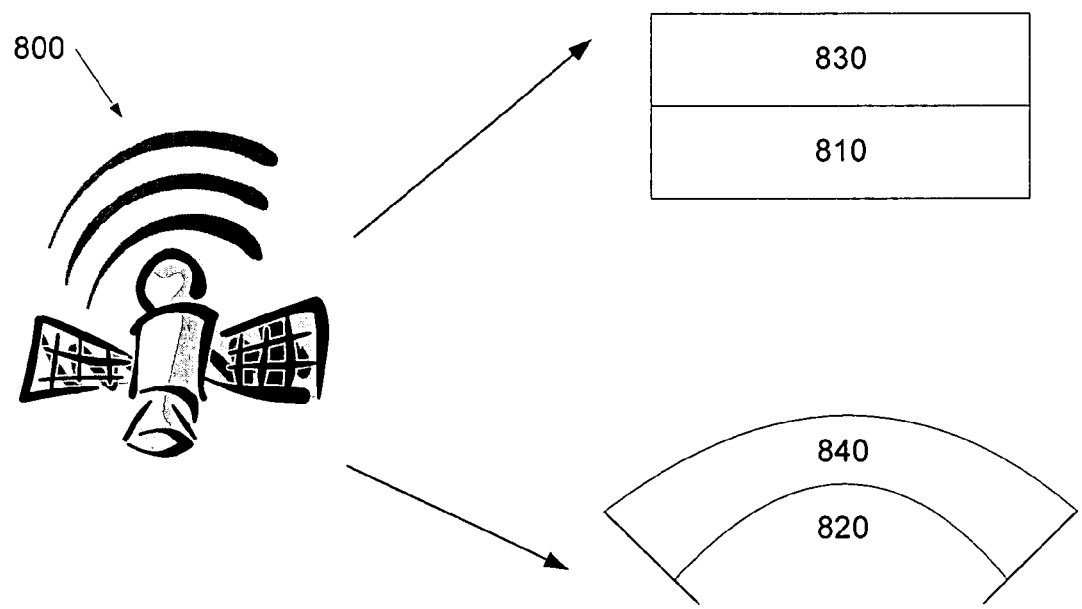
FIG. 8 is a simplified spacecraft protected by optical solar reflector according to an embodiment of the present invention.

FIG. 8 is a simplified spacecraft protected by optical solar reflector according to an embodiment of the present invention. This diagram is merely an example, which should not unduly limit the scope of the claims. One of ordinary skill in the art would recognize many variations, alternatives, and modifications. A spacecraft 800 is protected by optical solar reflectors in space. The spacecraft 800 may be a satellite, a space telescope, a space probe, or other. The spacecraft 800 has an exterior surface, which includes various surface sections. Some of the surface sections are flat, such as a flat surface section 810; while other sections are curved, such as a curved surface section 820. The flat surface section 810 is covered by an optical solar reflector 830, and the curved surface section 820 is covered by an optical solar reflector 840. The optical solar reflectors 830 and 840 may form one optical solar reflector. The optical solar reflectors 830 and 840 are substantially similar to the optical solar reflector 700.

It is understood the examples and embodiments described herein are for illustrative purposes only and that various modifications or changes in light thereof will be suggested to persons skilled in the art and are to be included within the spirit and purview of this application and scope of the appended claims.

What is claimed is:

1. A device for providing environmental stability and mechanical integrity in space, the device comprising:
    a substrate;
    a first silicon oxynitride layer on the substrate, the first silicon oxynitride layer having an overall tensile stress in a range from 0.01 MPa to 1 MPa;
    a second silicon oxynitride layer on the first silicon oxynitride layer, the second silicon oxynitride layer having an overall compressive stress.

2. The device of claim 1 wherein the compressive stress ranges from 10 MPa to 100 MPa.

3. The device of claim 1 wherein the substrate comprises at least one selected from a group consisting of polymer, ceramic, carbon composite, Kapton, black Kapton, aluminum, aluminum alloy, silver, gold, platinum, and titanium.

4. The device of claim 1 is free from delamination and cracking of the first silicone oxynitride layer and free from delamination and cracking of the second silicon oxynitride layer after at least 60 hours under a first UV radiation in a first vacuum condition.

5. The device of claim 4 wherein the first UV radiation has a first UV intensity equal to a second UV intensity of a second UV radiation received by a spacecraft in space.

6. The device of claim 5 wherein the first vacuum condition has a first vacuum pressure ranging from $1 \times 10^{-6}$ torr to $1 \times 10^{-3}$ torr.

7. The device of claim 1 is free from delamination and cracking of the first silicon oxynitride layer and free from delamination and cracking of the second silicone oxynitride layer after at least 3000 hours under a third UV radiation and a first electron and proton bombardment in a second vacuum condition.

8. The device of claim 7 wherein the first electron and proton bombardment has a first electron and proton intensity equal to a second electron and proton intensity received by a spacecraft in space.

9. The device of claim 8 wherein the third UV radiation has a third UV intensity equal to a fourth UV intensity of a fourth UV radiation received by the spacecraft in space.

10. The device of claim 9, wherein the second vacuum condition has a second vacuum pressure ranging from $1 \times 10^{-12}$ torr to $1 \times 10^{-7}$ torr.

11. The device of claim 1 wherein the first silicon oxynitride layer comprises $SiO_xN_y$, x ranging from a number greater than 0 to 2, y ranging from a number greater than 0 to 4/3.

12. The device of claim 11 wherein the second silicon oxynitride layer comprises $SiO_xN_y$, x ranging from a number greater than 0 to 2, y ranging from a number greater than 0 to 4/3.

13. A device for providing environmental stability and mechanical integrity in space, the device comprising:
a substrate;
a silicon oxynitride coating layer on the substrate, the silicon oxynitride coating layer having a changing stress, the changing stress being overall compressive on a top surface of the silicon oxynitride coating layer and overall tensile on a bottom surface of the silicon oxynitride coating layer,
wherein the silicone oxynitride coating layer comprises at least a first coating sub-layer and a second coating sub-layer, the second coating sub-layer on the first coating sub-layer, the second coating sub-layer having the compressive stress, the first coating sub-layer having the tensile stress,
wherein the first coating sub-layer has a first thickness ranging from 5 microns to 35 microns.

14. The device of claim 13, wherein the substrate comprises at least one selected from a group consisting of polymer, ceramic, carbon composite, Kapton, black Kapton, aluminum, aluminum alloy, silver, gold, platinum, and titanium.

15. The device of claim 14, wherein the substrate comprises a reflective layer, the reflective layer reflecting solar radiation.

16. The device of claim 14 wherein the substrate comprises at least one selected from a group consisting of silver, aluminum, gold, platinum, and titanium.

17. The device of claim 13 wherein the second coating sub-layer has a second thickness ranging from 0.5 microns to 5 microns.

18. The device of claim 17 wherein the first thickness equals 19.5 microns.

19. The device of claim 18 wherein the second thickness equals 2.5 microns.

* * * * *

UNITED STATES PATENT AND TRADEMARK OFFICE
CERTIFICATE OF CORRECTION

| | | |
|---|---|---|
| PATENT NO. | : 7,220,489 B1 | Page 1 of 1 |
| APPLICATION NO. | : 10/826645 | |
| DATED | : May 22, 2007 | |
| INVENTOR(S) | : Chang Wei et al. | |

It is certified that error appears in the above-identified patent and that said Letters Patent is hereby corrected as shown below:

Column 5, line 43 "$SiO_xN_y$ layer 3201," should read -- $SiO_xN_y$ layer $320_1$, --.

Signed and Sealed this

Nineteenth Day of August, 2008

JON W. DUDAS
*Director of the United States Patent and Trademark Office*